United States Patent
Lewis et al.

(10) Patent No.: US 11,372,946 B2
(45) Date of Patent: *Jun. 28, 2022

(54) SEARCH AND RETRIEVAL OF KEYED DATA MAINTAINED USING A KEYED DATABASE

(71) Applicant: Google LLC, Mountain View, CA (US)

(72) Inventors: Justin Lewis, South San Francisco, CA (US); Richard Dominick Rapp, Downey, CA (US)

(73) Assignee: Google LLC, Mountain View, CA (US)

( * ) Notice: Subject to any disclaimer, the term of this patent is extended or adjusted under 35 U.S.C. 154(b) by 94 days.

This patent is subject to a terminal disclaimer.

(21) Appl. No.: 16/845,237

(22) Filed: Apr. 10, 2020

(65) Prior Publication Data

US 2020/0242175 A1 Jul. 30, 2020

Related U.S. Application Data

(63) Continuation of application No. 15/571,297, filed as application No. PCT/US2016/069293 on Dec. 29, 2016, now Pat. No. 10,671,690.

(51) Int. Cl.
*G06F 7/00* (2006.01)
*G06F 16/00* (2019.01)
(Continued)

(52) U.S. Cl.
CPC .......... *G06F 16/957* (2019.01); *G06F 16/951* (2019.01); *G06F 16/9538* (2019.01);
(Continued)

(58) Field of Classification Search
None
See application file for complete search history.

(56) References Cited

U.S. PATENT DOCUMENTS

| 8,832,034 | B1 | 9/2014 | Ramarao |
| 2010/0042590 | A1 | 2/2010 | Smyros et al. |

(Continued)

FOREIGN PATENT DOCUMENTS

| CN | 101694672 | 4/2010 |
| CN | 102708216 | 3/2012 |

(Continued)

OTHER PUBLICATIONS

JP Office Action in Japanese Appln. No. 2019-160301, dated Apr. 1, 2016, 13 pages (with English translation).

(Continued)

*Primary Examiner* — Tuan A Pham
(74) *Attorney, Agent, or Firm* — Fish & Richardson P.C.

(57) ABSTRACT

This document describes a digital component deduplication system for generating packetized data with encryption tokens for transmittal over one or more packetized networks. A packetized data search determines that an encryption token is included with the packetized data. The encryption token includes keyed data representing a first digital component. The packetized data search engine searches the keyed database to identify contents, in the keyed database, of one or more entries that includes the keyed data representing the first digital component. A list of candidate digital components is generated. For candidate digital components associated with a data interface for requesting an eligibility value from a second client device associated with the candidate digital component, a security server generates, using the data interface, additional packetized data comprising i) a request for the eligibility value from the second client device, and ii) the encryption token.

20 Claims, 8 Drawing Sheets

(51) Int. Cl.
  *G06F 16/957* (2019.01)
  *G06F 16/958* (2019.01)
  *G06F 16/951* (2019.01)
  *G06F 16/9538* (2019.01)
  *G06F 21/62* (2013.01)
  *G06Q 30/02* (2012.01)

(52) U.S. Cl.
  CPC ........ *G06F 16/972* (2019.01); *G06F 21/6209* (2013.01); *G06Q 30/0241* (2013.01)

(56) References Cited

U.S. PATENT DOCUMENTS

| | | |
|---|---|---|
| 2010/0125569 A1 | 5/2010 | Nair |
| 2011/0016178 A1 | 1/2011 | Palmieri |
| 2012/0136726 A1 | 5/2012 | Caller |
| 2014/0108332 A1* | 4/2014 | Haze .................... G06F 21/105 707/609 |
| 2014/0280691 A1 | 9/2014 | Buerner |
| 2014/0289042 A1 | 9/2014 | Merriman et al. |
| 2015/0365345 A1 | 12/2015 | Sorenson, III |
| 2016/0254917 A1* | 9/2016 | Cooley ................ H04L 9/0844 713/171 |
| 2017/0286698 A1* | 10/2017 | Shetty .................. G06F 16/182 |

FOREIGN PATENT DOCUMENTS

| | | |
|---|---|---|
| CN | 104050098 | 9/2014 |
| CN | 104615692 | 5/2015 |
| JP | 2003-518820 | 6/2003 |
| JP | 2003-186787 | 7/2003 |
| JP | 2009-282833 | 12/2009 |
| JP | 2003-150543 | 3/2010 |
| JP | 2016-531347 | 10/2016 |

OTHER PUBLICATIONS

CN Office Action in Chinese Appln. No. 201680031771.4, dated Apr. 6, 2021, 12 pages (with English translation).

European Extended Search Report in European Application No. 19164122.4, dated Aug. 14, 2019, 9 page.

International Search Report and Written Opinion issued in International Application No. PCT/US2016/069293, dated Sep. 8, 2017, 13 pages.

JP Notice of Allowance in Japanese Appln. No. 2019-160301, dated Apr. 5, 2021, 5 pages (with English translation).

Office Action in European Appln. No. 19164122.4, dated Dec. 21, 2021, 9 pages.

* cited by examiner

SEARCH AND RETRIEVAL OF KEYED DATA MAINTAINED USING A KEYED DATABASE

CROSS-REFERENCE TO RELATED APPLICATIONS

This application is a continuation application (and claims the benefit of priority under 35 USC 120) of U.S. application Ser. No. 15/571,297, filed Nov. 2, 2017, which is a National Stage application under 35 U.S.C. § 371 of International Application No. PCT/US2016/069293, filed Dec. 29, 2016, the disclosures of which are herein incorporated by reference in its entirety.

TECHNOLOGICAL FIELD

This document relates to search and retrieval of keyed data maintained using a keyed database.

BACKGROUND

When a user is consuming digital content, a computer system that is serving the digital content can sometimes repeatedly serve the same digital content to a user.

SUMMARY

This document describes a digital component deduplication system including a keyed database storing keyed data, with each item of keyed data representing a particular digital component; a packetized data search engine that searches packetized data received from a first client device to determine that an encryption token is included with the packetized data, the encryption token comprising keyed data representing a first digital component, wherein the packetized data search engine searches the keyed database to identify contents, in the keyed database, of one or more entries that includes the keyed data representing the first digital component; a logic execution server that executes data logic to generate, based on the contents of the one or more entries that include the keyed data representing the first digital component, a list of candidate digital components; a registration interface that determines that a candidate digital component of the list is associated with a data interface for requesting an eligibility value from a second client device associated with the candidate digital component; and a security server that generates, using the data interface, additional packetized data comprising i) a request for the eligibility value from the second client device, and ii) the encryption token, wherein the logic execution server, in response to receiving the eligibility value of the request, designates, from the list of the candidate digital components, a second digital component for transmitting to the first client device, and wherein the second digital component is different than the first digital component.

In some implementations, the system includes a digital component assembly server performs actions including transmitting the second digital component and a second encryption token associated with the second digital component to the first client device. In some implementations, the packetized data includes first packetized data. In some implementations, the logic execution server generates, in response to a determination that the encryption token is not included in the first packetized data, second packetized data that comprises one or more instructions to i) generate the encryption token, and ii) transmit that encryption token and keyed data representing a digital component over the one or more packetized networks to the first client device. In some implementations, the security server receives an encryption key from the second client device. The security server decrypts the encryption token in response to a determination that the encryption token is included in the packetized data. The logic execution server removes, from the list of candidate digital components, a particular candidate digital component associated with a particular identifier that matches the keyed data of the decrypted encryption token.

In some implementations, the encryption key includes a private key of the second client device. In some implementations, the security server decrypts, using an encryption key provided by the second client device, the encryption token included in the packetized data, in response to a determination that a candidate digital component of the list is not associated with a data interface for requesting an eligibility value from a second client device. In some implementations, the keyed data includes data that uniquely identifies the digital component and, when the keyed data is decrypted, the keyed data matches an identifier of the encryption token.

In some implementations, the digital component deduplication system stores keyed data by a keyed database, with each item of keyed data representing a particular digital component; searching, by a packetized data search engine, packetized data received from a first client device to determine that an encryption token is included with the packetized data. In some implementations, the encryption token includes keyed data representing a first digital component, wherein the packetized data search engine searches the keyed database to identify contents, in the keyed database, of one or more entries that includes the keyed data representing the first digital component.

In some implementations, the digital component deduplication system executes, by a logic execution server, data logic to generate, based on the contents of the one or more entries that include the keyed data representing the first digital component, a list of candidate digital components. In some implementations, the digital component deduplication system determines, by a registration interface, that a candidate digital component of the list is associated with a data interface for requesting an eligibility value from a second client device associated with the candidate digital component. In some implementations, the digital component deduplication system generates, by a security server, using the data interface, additional packetized data comprising i) a request for the eligibility value from the second client device, and ii) the encryption token; and designating, from the list of the candidate digital components, by the logic execution server in response to receiving the eligibility value of the request, a second digital component for transmitting to the first client device, wherein the second digital component is different than the first digital component In some implementations, the digital component deduplication system transmits, by a digital component assembly server, the second digital component and a second encryption token associated with the second digital component to the first client device. In some implementations, the packetized data includes first packetized data. In some implementations, the logic execution server generates, in response to a determination that the encryption token is not included in the first packetized data, second packetized data that comprises one or more instructions to i) generate the encryption token, and ii) transmit that encryption token and keyed data representing a digital component over the one or more packetized networks to the first client device.

In some implementations, the digital component deduplication system receives, by the security server, an encryption key from the second client device; and decrypting, by the security server, the encryption token in response to a determination that the encryption token is included in the packetized data. The actions include removing, by the logic execution server, from the list of candidate digital components, a particular candidate digital component associated with a particular identifier that matches the keyed data of the decrypted encryption token. In some implementations, the encryption key includes a private key of the second client device.

In some implementations, the actions include decrypting, by the security server, using an encryption key provided by the second client device, the encryption token included in the packetized data, in response to a determination that a candidate digital component of the list is not associated with a data interface for requesting an eligibility value from a second client device. The keyed data comprises data that uniquely identifies the digital component and, when the keyed data is decrypted, the keyed data matches an identifier of the encryption token.

In some implementations, a non-transitory computer readable medium in communication with the digital component deduplication system performs actions including storing keyed data by a keyed database, with each item of keyed data representing a particular digital component. In some implementations, the actions include searching, by a packetized data search engine, packetized data received from a first client device to determine that an encryption token is included with the packetized data. In some implementations, the encryption token includes keyed data representing a first digital component. In some implementations, the packetized data search engine searches the keyed database to identify contents, in the keyed database, of one or more entries that includes the keyed data representing the first digital component.

In some implementations, the actions include executing, by a logic execution server, data logic to generate, based on the contents of the one or more entries that include the keyed data representing the first digital component, a list of candidate digital components. In some implementations, the actions include determining, by a registration interface, that a candidate digital component of the list is associated with a data interface for requesting an eligibility value from a second client device associated with the candidate digital component. In some implementations, the actions include generating, by a security server, using the data interface, additional packetized data comprising i) a request for the eligibility value from the second client device, and ii) the encryption token. In some implementations, the actions include designating, from the list of the candidate digital components, by the logic execution server in response to receiving the eligibility value of the request, a second digital component for transmitting to the first client device, wherein the second digital component is different than the first digital component.

In some implementations, the actions further include transmitting, by a digital component assembly server, the second digital component and a second encryption token associated with the second digital component to the first client device. In some implementations, the packetized data includes first packetized data In some implementations, the logic execution server generates, in response to a determination that the encryption token is not included in the first packetized data, second packetized data that comprises one or more instructions to i) generate the encryption token, and ii) transmit that encryption token and keyed data representing a digital component over the one or more packetized networks to the first client device.

In some implementations, the actions include receiving, by the security server, an encryption key from the second client device; and decrypting, by the security server, the encryption token in response to a determination that the encryption token is included in the packetized data. In some implementations, the actions include removing, by the logic execution server, from the list of candidate digital components, a particular candidate digital component associated with a particular identifier that matches the keyed data of the decrypted encryption token. In some implementations, the encryption key includes a private key of the second client device.

In some implementations, the actions include decrypting, by the security server, using an encryption key provided by the second client device, the encryption token included in the packetized data, in response to a determination that a candidate digital component of the list is not associated with a data interface for requesting an eligibility value from a second client device. In some implementations, the keyed data includes data that uniquely identifies the digital component and, when the keyed data is decrypted, the keyed data matches an identifier of the encryption token.

The described system may provide for one or more benefits, such as reducing the latency for serving digital content that is caused by a logic execution process (e.g., evaluation, auction, etc.) and retrieval of digital components (e.g., ads, videos, text, audio, etc.). A logic execution server evaluates digital components that have not been served to a terminal device, such as during defined session of serving digital components, and ignores digital components that have been identified already having been served to the terminal device during the session (e.g., a browsing session). Since fewer candidate digital components are considered during the logic execution process, the digital component deduplication system reduces the latency for serving the digital component due to the logic execution process.

The digital component deduplication system reduces bandwidth usage for serving digital components by identifying redundant digital components before logic execution. The digital component deduplication system sends fewer packetized requests over a network of the networked system than a system that does not identify redundant digital components before logic execution, reducing bandwidth usage. A list of candidate digital components under consideration to be sent to a terminal device is thus pared back to digital components that have not been served to the terminal device during a session (e.g., a browsing session). For example, the digital component deduplication system avoids sending requests for eligibility values (e.g., bid data) to digital component providers associated with ignored candidate digital components, reducing bandwidth usage.

Digital components that have not been served to the terminal device during the session can be more relevant or interesting to a user of the terminal device, and can thus provide more value to a digital component provider (e.g., advertiser).

The digital component deduplication system enables coordination between multiple logic execution platforms. Digital component providers can use several logic execution platforms that can coordinate to avoid each serving a copy of the same digital component to the terminal device of the user after performing logic execution processes for the user. This enables digital content providers to choose one or many logic execution platforms that are the most competitive for the needs of the digital component provider. The digital component provider avoids a situation where each logic execution platform serves the same digital component to the terminal device, resulting in repeated viewings by the user of the terminal device during the session, which provides diminished value to the digital component provider and frustrates the user. Additionally, the digital component deduplication system uses encryption techniques to ensure that user privacy and digital component identity are not compromised during coordination of the logic execution platforms by the digital component deduplication system.

The digital component can be stored in a memory of the system or to a disk of the system. Storing the digital component in memory reduces the latency for serving the digital component in response to a request in real-time because the system serves the digital component without performing a data query and retrieval from a database. The described system serves digital components that are more relevant to a user. The described system uses a keyed data index to increase retrieval speed relative to non-indexed keyed data of cached data and associate cached data with digital components without requiring identification of the digital component to the logic execution server.

The details of one or more embodiments are set forth in the accompanying drawings and the description below. Other features, objects, and advantages of the techniques described herein will be apparent from the description and drawings, and from the claims.

DESCRIPTION OF DRAWINGS

Like reference symbols in the various drawings indicate like elements.

DETAILED DESCRIPTION

Figure 1:
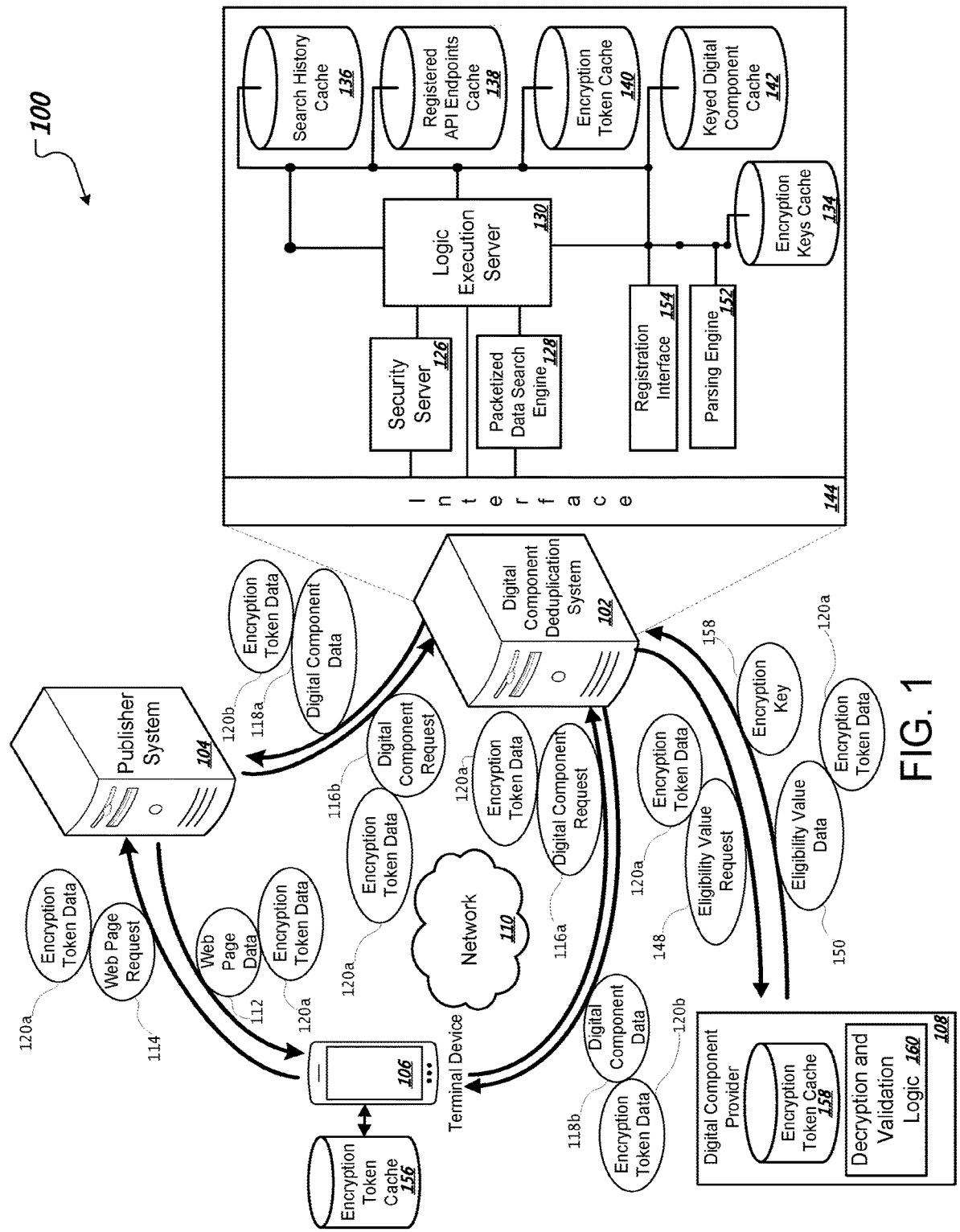
FIG. 1 is a diagram of a networked environment for digital component service deduplication.

This document describes a system that deduplicates (e.g., eliminates or reduces redundancy) of digital components sent to a client device (e.g., a terminal device or a publisher system), such as when a terminal device is browsing the Internet. As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component. Generally, a digital component is defined by (or provided by) a single provider or source (e.g., an advertiser, publisher, or other content provider). As discussed in more detail below, digital components from multiple different sources can be combined into a single electronic document (e.g., collection of various different digital components), and portions of various digital components from different sources can be combined into a single digital component with information extracted from search results (or other portions of content).

The system deduplicates service of digital components by analyzing keyed data maintained using a keyed database that represents a list of digital components that have already been sent to the client device. Generally, keyed data includes data associated with (e.g., stored with, transmitted with, pointing to, etc.) a key (e.g., a unique identifier) and/or a key itself, as described in further detail below. Generally, a keyed database includes a database in which data entries or records are associated with or indexed with keys, e.g., for subsequent retrieval. Based on processing and analysis of the keyed data, the system removes from consideration for transmittal the digital components that have already been sent to the client device. Generally, the deduplication discussed herein produces a decrease in bandwidth usage for digital component delivery, e.g., relative to bandwidth usage incurred in the delivery of digital components independent of the deduplication. By analyzing the keyed data before performing one or more logic execution processes, fewer data requests and subsequent responses are sent across a network of the system, reducing bandwidth usage.

When a terminal device requests a digital component from a system such as a publisher system, several processes are initiated in response to the request. These processes, which are used to assemble the web page or application interface that is served to the terminal device, include one or more requests made to various systems connected by the Internet and computations by the various systems, and take time. The digital component deduplication system described below reduces the time latency between the request of a terminal device for a digital component and the assembly and service of the digital component to the terminal device, relative to a latency of assembling and service of the web page to the terminal device independent of using the digital component deduplication system. The digital component deduplication system reduces the latency by reducing the number of digital components considered during the logic execution process to be less than then entire set of candidate digital components. Since fewer digital components are considered and fewer instructions and responses are sent and received, the digital component deduplication system processes less data than during a typical logic execution process, increasing processing speed and reducing the latency for performing the logic execution process and serving the digital component.

For example, the digital component deduplication system computes logic execution results (e.g., auction results, scoring results, or the results of another logic execution process). Eligibility values (e.g., bids) for candidate digital components are requested from a digital component provider (e.g., a third-party content provider) for each digital component being evaluated. However, eligibility values are requested only for digital components that have not been served already during a session, such as a specified or dynamically defined duration of time (e.g., a browsing session, predetermined time period, etc.). The logic execution server designates a digital component from the set of candidate digital components during a logic execution process by using the received eligibility values. The digital component deduplication system retrieves the designated digital component (e.g., video clips, audio clips, images, text, or a combination thereof) from a digital content provider or from a keyed digital component cache. The digital component, which has not yet been served to the client device during the session, is then served to the client device.

Referring to FIG. 1, networked environment 100 includes a digital component deduplication system 102 that is configured to communicate (e.g., over a network 110) with a publisher system 104, a terminal device 106, and a digital component provider 108. The digital component deduplication system 102 includes a computing system (e.g., a server system). The functions being performed by these various devices can be implemented in a single hardware device or a single set of hardware devices, or as separate hardware devices. For example, the digital component deduplication system 102 can be implemented as a single server or a number of networked servers.

The digital component deduplication system 102 includes an interface 144, a logic execution server 130, a security server 130, a packetized data search engine 128, an encryption keys cache 134, a search history cache 136, a registered API endpoints cache 138, an encryption token cache 140, a keyed digital content cache 142 (e.g., a keyed database), a packetized data parser 152, and a registration interface 154. For example, the one or more caches described above are keyed databases, such that individual data records are associated with a key (e.g., a user identifier or other unique identifier). The keyed databases are configured to store the keyed data 120 received from the terminal device 106. A server comprises one or more of a computer processor, logic engine, server system, software module, or any combination thereof.

The publisher system 104 includes a computing system (e.g., a server system) that is configured to receive requests to deliver digital content (e.g., web page data 112) to other systems such as the terminal device 106. The publisher system 104 requests 116b digital component data from the digital component deduplication system 102 to fill digital content slots on various web pages of the publisher before serving the web page data 114 to the terminal device 106. A digital content slot includes a location in a web page designated by a content tag (e.g., a digital content tag). Page assembly operations populate the content slot with digital component data based on the digital content tag associated with (e.g., referencing, pointing to, selected for, etc.) the digital content slot.

The terminal device 106 includes a computing device, such as a laptop, tablet, mobile phone, or other computing device. The terminal device 106 sends (e.g., transmits) a request for a digital component (e.g., a web page request 114, digital component request 116b) to the publisher system 104, to the digital component deduplication system 102, or both. The terminal device 106 sends keyed data to the digital component deduplication system 102. The keyed data includes the encryption token data 120a, described in greater detail below. For example, the keyed data is different than a device identifier of the terminal device 106. For example, the keyed data includes a user identifier indicative of a profile of the user for an application installed or otherwise running on the terminal device 106 or for a program associated with (e.g., configured to interact with, etc.) the digital component deduplication system 102. For example, the user identifier is associated with (e.g., grouped with, pointing to, etc.) the terminal device 106 because the terminal device 106 is sending the keyed data 120 indicative of the user identifier. For example, the user identifier is indicative of user demographics. The keyed data is received by the digital component deduplication system 102 and stored in one or more of the search history cache 136 and the encryption token cache 140.

The keyed data of the terminal device includes the contents of the encryption tokens cache 156 of the terminal device 106, which is transmitted as encryption token data 120a. The encryption tokens cache 156 stores encryption tokens (e.g., encrypted identifiers-identifier pairs) for each digital component received by the terminal device 106 over the network 110 for a session. The encryption tokens stored by the encryption tokens cache are sent to the digital component deduplication system 102 as encryption tokens data 120a along with a digital component requests 116a-b. The encryption token data 120a, 120b are used by the digital component deduplication system to determine if a digital component has already been served to the terminal device during the session as described below. The encryption token data 120a represents one or more digital components that have already been served to the terminal device 106 during the current session. The encryption token data 120b represents the next designated digital component to be served to the terminal device 106. The encryption token cache 156 receives and stores the encryption token of encryption token data 120b, which becomes part of the next transmittal of encryption data 120a from the terminal device 106. The encryption token cache 156 is cleared when a session ends. The session can end when the user closes an application (e.g., a browser) on the terminal device, after a predetermined period of time, when a new network domain is requested, when the number of items in the cache reaches a predetermined number, and so forth.

An encryption token received by the terminal device 106 in encryption data 120b is stored in the encryption token cache 156. The encryption token represents a digital component that is received from the digital component deduplication system 102 when the digital component deduplication system 102 serves the first instance of the digital component, such as digital component data 118b. The encryption token data 120b representing the digital component of the digital component data 118a-g is cached by the terminal device in the encryption token cache 156. The encryption token (and any other encryption tokens received by the terminal device) is transmitted to the digital component deduplication system 102 as encryption token data 102a when the terminal device 102 transmits a digital component request 116a.

The digital component provider 108 is configured to receive a request for digital component data or for an eligibility value 148 and provide the digital component data or eligibility value data 150. The digital component provider 108 can be an advertiser. For example, the digital component provider 108 includes a server that sends digital content data 150 that is indicated by a content tag related to a web page or that is selected by the logic execution server 130 for presentation in a web page.

The digital component provider 108 includes an encryption token cache 158. The encryption token cache 158 stores encryption tokens. The encryption tokens can be generated (e.g., encrypted) by the digital component provider 108 for serving in response to an eligibility value request 148 that is sent by the digital component deduplication system 102. The digital component provider 108 will encrypt and send encryption token data 120a when an eligibility value request 148 is received from the digital component deduplication system 102 without any encryption data 102a, meaning that no digital component has previously been served to the terminal device during the current session (and that any digital component is eligible to be served by the digital component provider 108 using conventional generation of eligibility values.

In some implementations, the digital component provider 108 receives encryption token data 102a from the digital component deduplication system 102 along with the eligibility value request 148. The digital component provider 108 can decrypt the encryption token data 102*a* using the public or private key of the digital component provider 108. The digital component provider decrypts the encryption token data 120*a* received from the digital component deduplication system 102 when the digital component deduplication system 102 sends an eligibility value request 148. The digital component provider 108 parses the request for the encryption token data 120*a* and stores the data 120*a* in the encryption token cache 158. When the digital component provider 108 receives subsequent encryption token data 120*a* in a subsequent eligibility value request 148, the digital component provider 108 checks the encryption token cache 158 for the encryption token of the encryption token data 120*a*.

The digital component provider 108 uses the encryption token data 120*a* to identify whether the digital component for which the eligibility value is requested by the digital component deduplication system 102 has already been served to the terminal device 106 during the current session. The digital component provider 108 can decrypt the encryption token data 120*a* to have a digital component identifier (e.g., an identifier that uniquely identifies a digital component) and a decrypted digital component identifier. The digital component provider 108 performs a validation comparison of the decrypted identifier, using a decryption and validation logic engine 160, to compare the decrypted identifier to a digital component identifier included in the encryption token data 120*a*. If the digital component provider 108 finds a match, the digital component provider 108 returns a low eligibility value for the digital component so that the digital component deduplication system 102 does not select the digital component during subsequent logic execution processes for sending to the terminal device 106. The low eligibility value reflects the diminished value to the digital component provider 108 for providing the digital component to the terminal device 106 for the current session.

The digital component deduplication system 102 receives and responds to requests over the network 110 (e.g., the Internet) for one or more of search results, digital component requests 116*a*-*b*, digital component data 118*a*-*g*, and other data using several modules and subsystems. The digital component deduplication system 102 includes the communication interface 144 configured to communicate with one or more of the publisher system 104, the terminal device 106, or the digital component provider 108 over the network 110. The communication interface 144 communicates data of the received requests from the network 110 to one or more subsystems or modules of the digital component deduplication system 102, such as the logic execution server 130, the security server 130, or packetized data search engine 128.

The logic execution server 130 receives the eligibility value data 150 from the digital component provider 108 and runs a logic execution process (e.g., auction, scoring process, or another logic execution technique) for the digital components represented by the eligibility values 150. For example, the logic execution server 130 includes a third-party logic execution server. The logic execution server 130 runs a logic execution process for each of the candidate digital components, as described in further detail below.

The packetized data search engine 128 includes one or more computing devices (e.g., servers) configured to receive a search query 158 and return search results from the Internet. The search results include a mix of web pages, images, and other types of files. The packetized data search engine 128 also mines data available in databases or open directories. The packetized data search engine 128 maintains real-time information by running an algorithm on a web crawler. For example, the search engine 128 includes a third-party search engine.

The packetized data parser 152 receives the digital component requests 116*a*-*b* and parses the request for encryption token data 120*a*. The encryption token data 120*a* includes the encryption tokens provided from the terminal device 106 that indicate which digital components have already been served to the terminal device during the current session. The packetized data parser 152 determines whether an encryption token is present in the digital component requests 116*a*-*b*. If an encryption token is present, the packetized data parser 152 sends the encryption token data 120*a* to the security server 126 for decryption (if applicable) or forwards the encryption data 120*a* to the digital component provider 108 for decryption with the eligibility value request 148 sent by the logic execution server 130.

The security server 126 receives the encryption token data 120*a* from the packetized data parser 152. In some implementations, the security server 126 has already received the encryption key 158 of one or more digital component providers (e.g., digital component provider 108). The encryption key 158 is used to decrypt the encryption token received in the encryption data 120*a*. In some implementations, the encryption key 158 is the digital component provider's 108 private key. In some implementations, the encryption key 158 is the digital component provider's 108 public key. The public key can be used by the security server to encrypt an encryption token for transmitting to a client, such as a terminal device 106 or to a publisher system 104, as encryption token data 120*b*. In some implementations, if the digital component deduplication system 102 does not have the encryption key of the digital component provider 108, the encryption token data 120*a* is forwarded to the digital component provider 108 for decryption of the encryption token data 120*a* as described above. The encryption token data 120*a* is forwarded with an eligibility value request 148 during the logic execution process of the logic execution server 130.

In some implementations, the security server 126 does not decrypt the encryption token data 120*a*, even if the digital component deduplication system 102 has already received the encryption key from the digital component provider 108. The security server 126 instead waits for the registration interface 154 to determine that a candidate digital component of the logic execution process is not associated with an eligibility value application programming interface (API) endpoint (which precludes requesting the digital component provider 108 to decrypt the encryption data 120*a*). In this case, the security server 126 decrypts the encryption data 120*a* so that duplicate digital components can be removed from the logic execution process of the logic execution server 130.

The registration interface 154 registers one or more digital component providers with the digital component deduplication system 102. The registration interface 154 uses an eligibility value request API to register the digital component providers with the digital component deduplication system 102. The registration interface can be checked to determine whether the digital component publisher is participating in the deduplication process. If the digital component is participating, encryption token data 120*a* can be sent to the digital component provider during the logic execution process of the logic execution server 130. The registration interface 154 can store the list of registered digital component providers in the registered API endpoints cache 138.

The logic execution server 130 receives the encryption tokens from the encryption data 120*a* and performs one or more logic execution processes for designating digital component to be served to the client device in response to a request for the digital component. The logic execution server 130 generates a list of candidate digital components. If no encryption token was found by the packetized data parser, the logic execution server 130 proceeds to request 148 eligibility values from one or more digital component providers. The request does not include encryption token data 120*a* in this case because the dataset is either empty or has not been received from the terminal device 106, indicating that the current session is fresh and that no digital component has yet been served during the current session to the terminal device.

The digital component provider returns eligibility value data 150 and associated encryption token data 120*b* indicative of a digital component to be served (if the digital component is designated by the logic execution server 130 to be served). The logic execution server 130, after receiving all requested eligibility values from digital component providers 108, performs a logic execution process and designates a digital component to be served. The designated digital component and associated encryption token are sent to the client device.

In some implementations, the logic execution server 130 receives data indicative of an encryption token received from the terminal device 106. If the security server has decrypted the encryption token from the encryption token data 120*a*, the logic execution server 130 validates the decrypted identifier by comparing the decrypted identifier to an unencrypted identifier of the encryption token. If a match is found, then the digital component is disqualified from the logic execution process and is removed from the list of candidate digital components. No request is sent to the digital component provider 108, reducing bandwidth usage that would otherwise be needed to send and received eligibility values from the digital component provider 108. In addition, since fewer digital components are evaluated during the logic execution process, processing time is reduced and latency caused by the logic execution process is reduced relative to a process that evaluates all candidate digital components of the platform for serving.

In some implementations, the logic execution server receives data indicative of an encryption token received from the terminal device 106 that has not been decrypted by the security server 126. The logic execution server 130 forwards the encryption token data 120*a* to the digital component provider 108 for decryption as described above. The digital component provider returns eligibility value data 150 including an eligibility value reflective of whether the digital component has already been presented based on the validation processes of the decryption and validation logic 160 of the digital component provider 108. The eligibility value data 150 thus automatically accounts for the value of the digital component to the digital component provider, and the logic execution server performs a logic execution process using the eligibility value data 150. Each of the described logic execution processes ensures that duplicative digital components are not sent to a terminal device during a single session.

The caches of the digital component deduplication system 102 are used for storing data. The caches of the digital component deduplication system 102 can be combined into a single location or be discrete caches.

The search history cache 136 includes a data store in memory or on disk, e.g., a database such as a distributed database. The search history cache 136 includes data representing search queries sent by the terminal device 106. The digital component deduplication system 102 caches search queries because the search queries provide a robust data set for a terminal device 106 for performing logic execution processes.

The encryption token cache 140 stores encryption tokens received by the digital component deduplication system 102 in the encryption token data 120*a*. The encryption tokens are associated with the terminal device 106 and are used during the logic execution processes. The encryption token cache 140 includes a data store in memory or on disk, e.g., a database such as a distributed database.

The keyed digital component cache 142 stores digital components that have been retrieved for the logic execution process, such as candidate digital components. The keyed digital component cache 142 includes a data store in memory or on disk, e.g., a database such as a distributed database. The digital component includes one or more of text, images, videos, application files, audio, and the like. As stated above, the keyed digital component cache 142 includes a memory of the system. Storing the digital component in a memory reduces the latency for serving the digital component in response to a request for the digital component, such as by the publisher system 104 or the terminal device 106. The latency for serving the digital component is real-time because the system serves the digital component without performing a data query and retrieval from a database. The keyed digital component cache 142 is described in greater detail with respect to FIG. 2A.

The encryption keys cache 134 stores the encryption keys (both public and private) received from the digital component providers. The encryption keys cache 134 can be combined with and include the encryption token cache 140 or any other cache.

The publisher system 104 includes a server or network of servers that host web page content. The publisher system 104 can include a commercial hosting service or an individual server. The publisher system 104 serves web page data 112 to the terminal device 106 in response to requests for web page data 112 from the web addresses hosted by the publisher system 104.

When a terminal device 106 requests web page data 112, the publisher system 104 sends a request for digital component data 116*b* from the digital component deduplication system 102 to populate any digital component slots of the requested web page. If the publisher system 104 receives encryption token data 120*a* from the terminal device 106, the publisher system 104 forwards the encryption token data 120*a* to the digital component deduplication system 102. The digital component deduplication system 102 receives the encryption token data 120*a* and the request 116*a* for digital component data. The digital component deduplication system 102 performs a logic execution as described above, and returns to the publisher system 104 digital component data 118*a*-*g* and encryption token data 120*b* that includes a different encryption token than the encryption token data 120*a*. The encryption token data 120*b* represents the digital component data that has not yet been served to the terminal device 106, while the encryption data 120*a* includes encryption tokens for digital components that have already been served to the terminal device during the current session.

The digital component data 118a and encryption data 120b are sent to the publisher system 104, which serves the encryption token data 120b and the requested web page to the terminal device 106 with the digital component designated by the logic execution server 130.

Figure 2A:
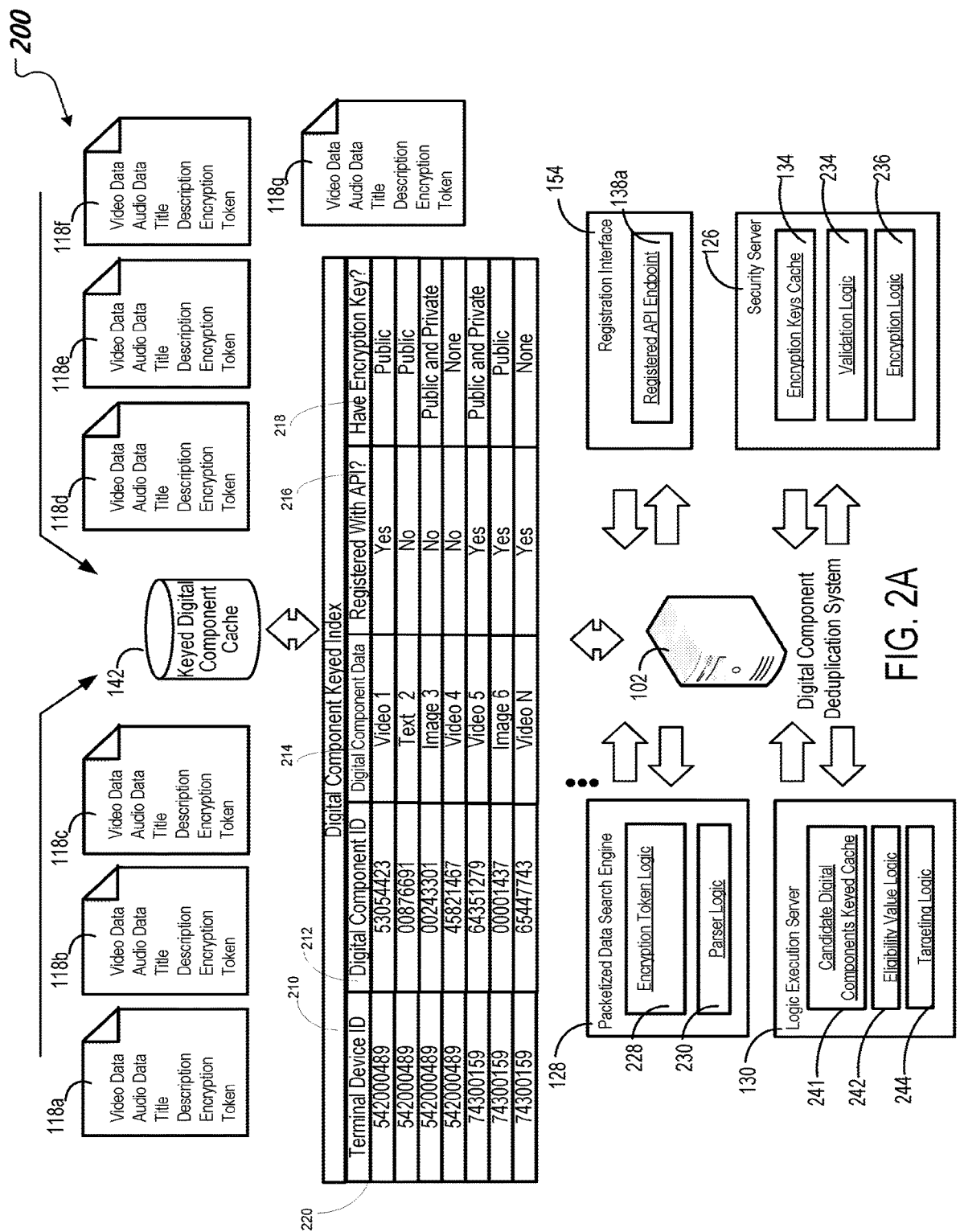
FIG. 2A shows a keyed indexed database.

Referring to FIG. 2A, a diagram of the keyed digital component cache environment 200 is shown. The keyed digital component cache 142 indexes the data that is used for the logic execution processes of the digital component deduplication system 102. References 212 to digital components are stored in the keyed digital component cache 142, or the digital components themselves 214 are stored. The keyed digital component cache 142 includes a digital component keyed index 210 that associates the digital component reference to (if applicable) associated digital component data and indicators indicative of other data associated with the digital components (e.g. candidate digital components). For example, the digital component keyed index 210 can include an indicator 216 that points to the registration of the digital component provider of the digital component with the eligibility value API. The digital component keyed index 210 can include indicators 218 that indicate whether the digital component deduplication system 102 has received an encryption key for the digital component provider associated with the digital component and the type of key received. The logic execution server 130 uses this data to determine which processes to trigger during the logic execution process. The digital component keyed index 210 includes a list of device identifiers 220 that associates the encryption token data 120a with the device that sent the data.

In some implementations, the packetized data search engine includes encryption token logic 228 for determining whether an encryption key is present in the received digital component request 116a-b. The encryption token logic uses the parser logic 230 to ignore digital component request data. The encryption token logic can detect particular headers, appended data, etc. that are used in the encryption scheme to determine if the encryption tokens are present. The encryption token logic 228 can pass the resulting indication to the digital component keyed index 210 of the keyed digital component cache 142.

In some implementations, the logic execution server 130 includes a candidate digital component keyed cache 241. The candidate digital component keyed cache 241 can be used to store the list of candidate digital components during logic execution processes. The candidate digital component keyed cache 241 can be combined with the keyed digital component cache 142.

The eligibility value logic 242 of the logic execution server 130 is used to make determinations for designating a digital component during logic execution processes. For example, the highest eligibility value could be used to designate a digital component for sending to the client. In some implementations, eligibility value logic 242 recognizes a particular eligibility value sent by the digital component provider 108 to determine that a candidate digital component should be eliminated from consideration in the logic execution processes. For example, the eligibility value can be zero, a negative number, etc. The eligibility value logic 242 thus discards digital components from consideration that have already been shown during the current session (e.g., are duplicative) or that are otherwise not desirable for sending.

Targeting logic 244 is used during the logic execution processes to weight eligibility values received from digital component providers. Digital components that are particularly relevant to the user of the terminal device are weighted more heavily. Since, for a particular user, the targeting logic 244 may consistently weight particular candidate digital components highly, the logic execution engine disqualifies the digital components that have already been shown as determined by the logic execution processes described above.

The registration interface 154 can invoke registered API endpoints 138 that are associated with the digital component publishers to which the candidate digital components are associated. If the digital component publishers have registered, the API endpoint is invoked, and the eligibility value request 148 is sent with the encryption token data 120a.

The security server 126 can include the encryption keys cache 134, validation logic 234, and encryption logic 236. The validation logic 234 compares decrypted encryption tokens to identifiers associated with the digital component to determine if the digital component has been presented during the current session. The validation can be a comparator operation, equivalence operation, or other operation that compares the decrypted token to the identifier of the digital component. The encryption logic 236 performs encryption and decryption functions for the digital component deduplication system 102. For example, the encryption logic can use the public key received from a digital component provider 108 to encrypt an encryption token or use the public or private key of the digital component provider 108 to decrypt the encryption token of encryption token data 120a.

Figure 2B:
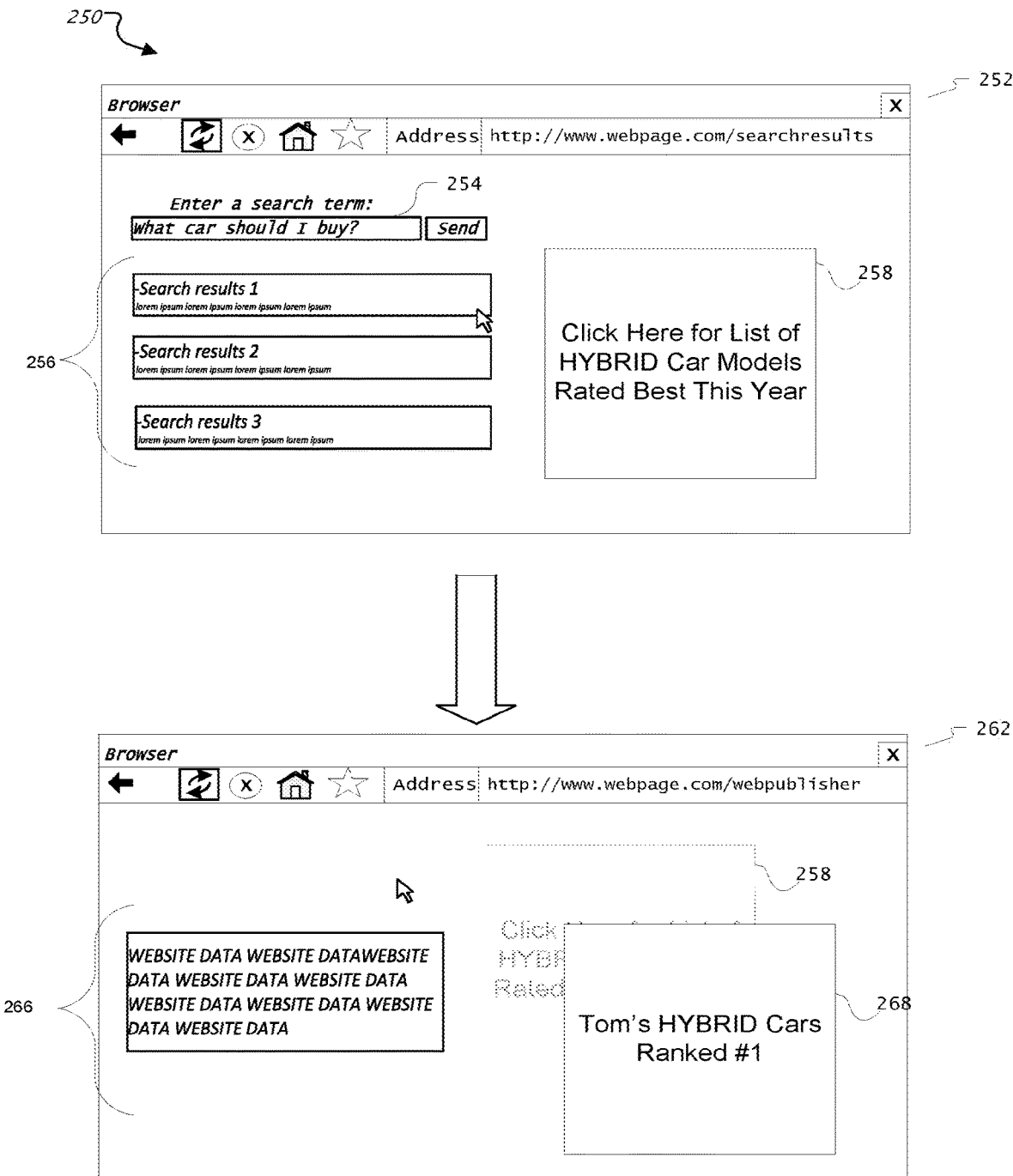
FIG. 2B shows graphical user interfaces.

FIG. 2B shows a comparison 250 of two graphical user interfaces 252, 262 that display on a client device (e.g., terminal device 106 of FIG. 1). Graphical user interface 252 includes a search query 254 from a user. The search query 254 is used to generate a request 116a-b for digital component data. The logic execution processes target a particular digital component 258 and search results 256 based on the query and other keyed data associated with a terminal device. For interface 252, no deduplication is used, and the same digital component 258 can be presented each time the user inputs the same query.

Interface 262 shows a subsequent web page visited by the user of the terminal device 106. The web page data 266 are displayed. However, instead of displaying the same digital component 258 that the user just saw in interface 252, a new digital component 268 is designated for appearing on the page.

Figure 3:
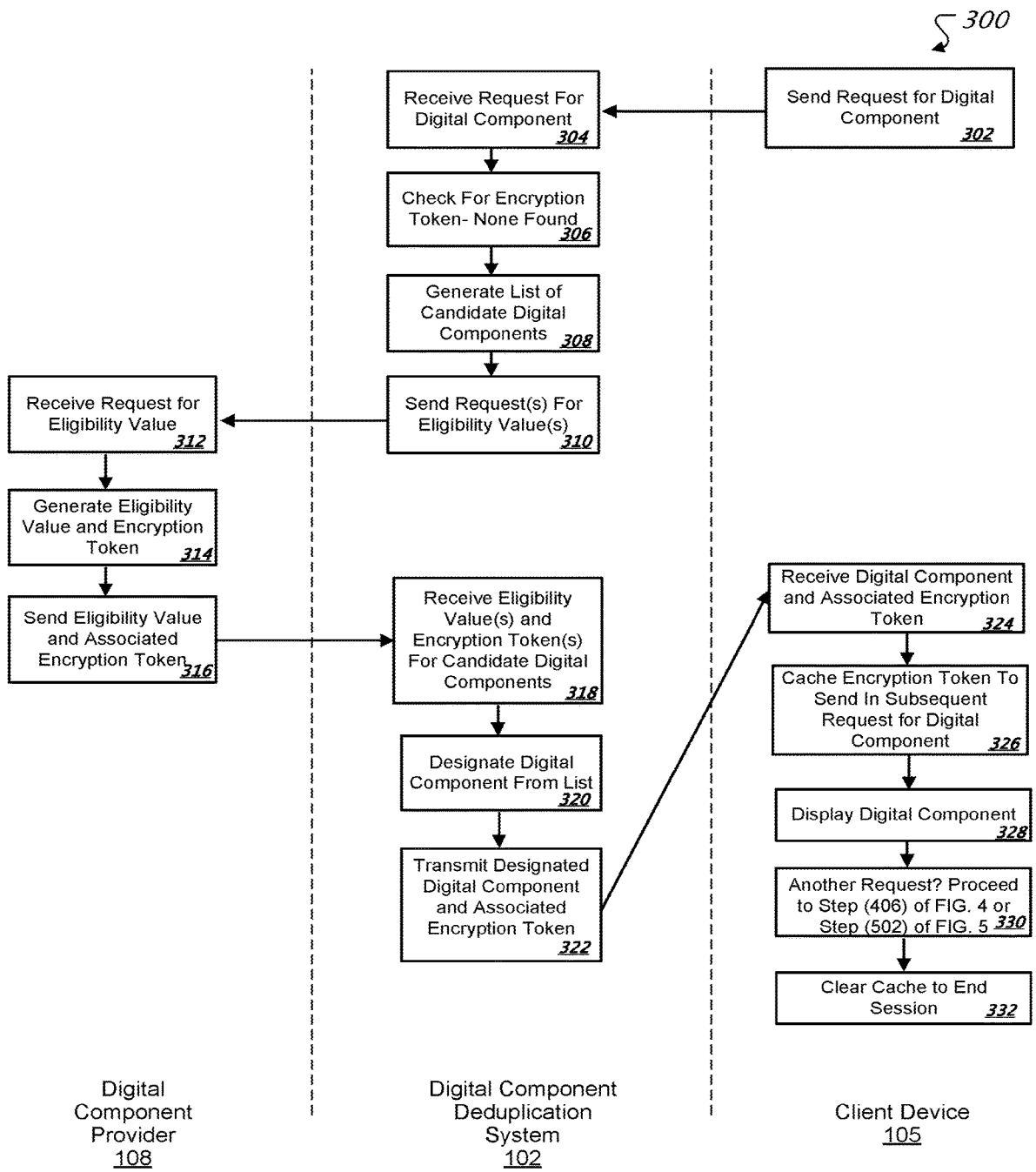
FIG. 3-5 are diagrams showing actions taken for digital component service deduplication.

FIG. 3 is a diagram showing actions 300 taken for digital component service deduplication. The client device sends (302) a request for a digital component. The digital component deduplication system 102 receives (304) the request for the digital component. The digital component deduplication system 102 checks (306) for an encryption token. If no token is found, the digital component deduplication system 102 generates (308) a list of candidate digital components (308). The digital component deduplication system 102 sends (308) a request for eligibility values to the digital component provider 108.

The digital component provider 108 receives (312) the eligibility value request and generates (314) eligibility values and encryption tokens for responding to the request. The digital component provider 108 sends (316) the eligibility values and encryption token to the digital component deduplication system 102.

Figure 4:
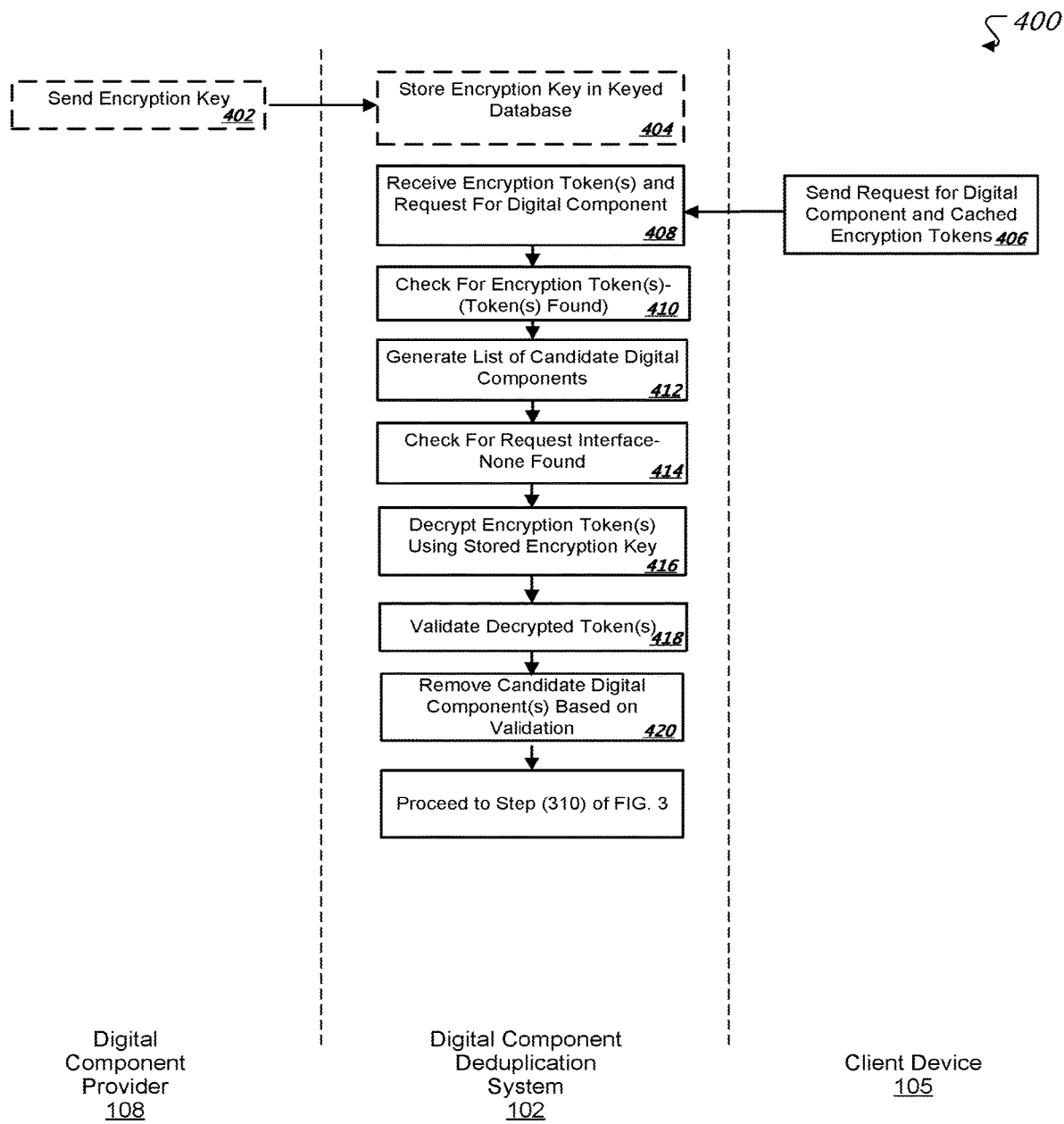

The digital component deduplication system 102 receives (318) the eligibility values and encryption tokens for candidate digital components. The digital component deduplication system 102 designates (320) a digital component from the list based on logic execution processes. The digital component deduplication system 102 transmits (322) the digital component and associated encryption token to the client device 105 (e.g., terminal device 106 of FIG. 1). The client device 105 receives (324) the digital component and associated token and caches (326) the encryption token for use for responding to a subsequent request for a digital component. The client device 105 displays (328) the digital component. If another request is being sent (330) the client device 105 proceeds to step (406) as shown in FIG. 4, below. If the current session is ending, the client device 105 clears the cache (332) of encryption token data.

FIG. 4 shows actions taken 400 for digital component service deduplication. In some implementations, the digital component provider sends (402) encryption key to the digital component deduplication system 102. The digital component deduplication system 102 stores (404) the encryption key in a keyed database.

The client device 105 (e.g., terminal device 106 of FIG. 1) sends (406) a request to the digital component deduplication system 102 for a digital component, and the request includes the encryption token data that the client device has cached. The digital component deduplication system 102 receives (408) the request for the digital component and checks (410) for encryption tokens. Since the request includes an encryption token, the token is found. The digital component deduplication system 102 generates (412) a list of candidate digital components. The digital component deduplication system 102 checks (414) for a request interface associated with the digital component. If none is found, the digital component deduplication system 102 decrypts (406) the encryption token using the stored encryption key. The digital component deduplication system 102 validates (418) the decrypted token and removes (420) the digital component from the list of candidate digital components based on the results of the validation (e.g., if a match is found indicative of prior service of the digital component). The process then continues as shown by step 310 of FIG. 3.

Figure 5:
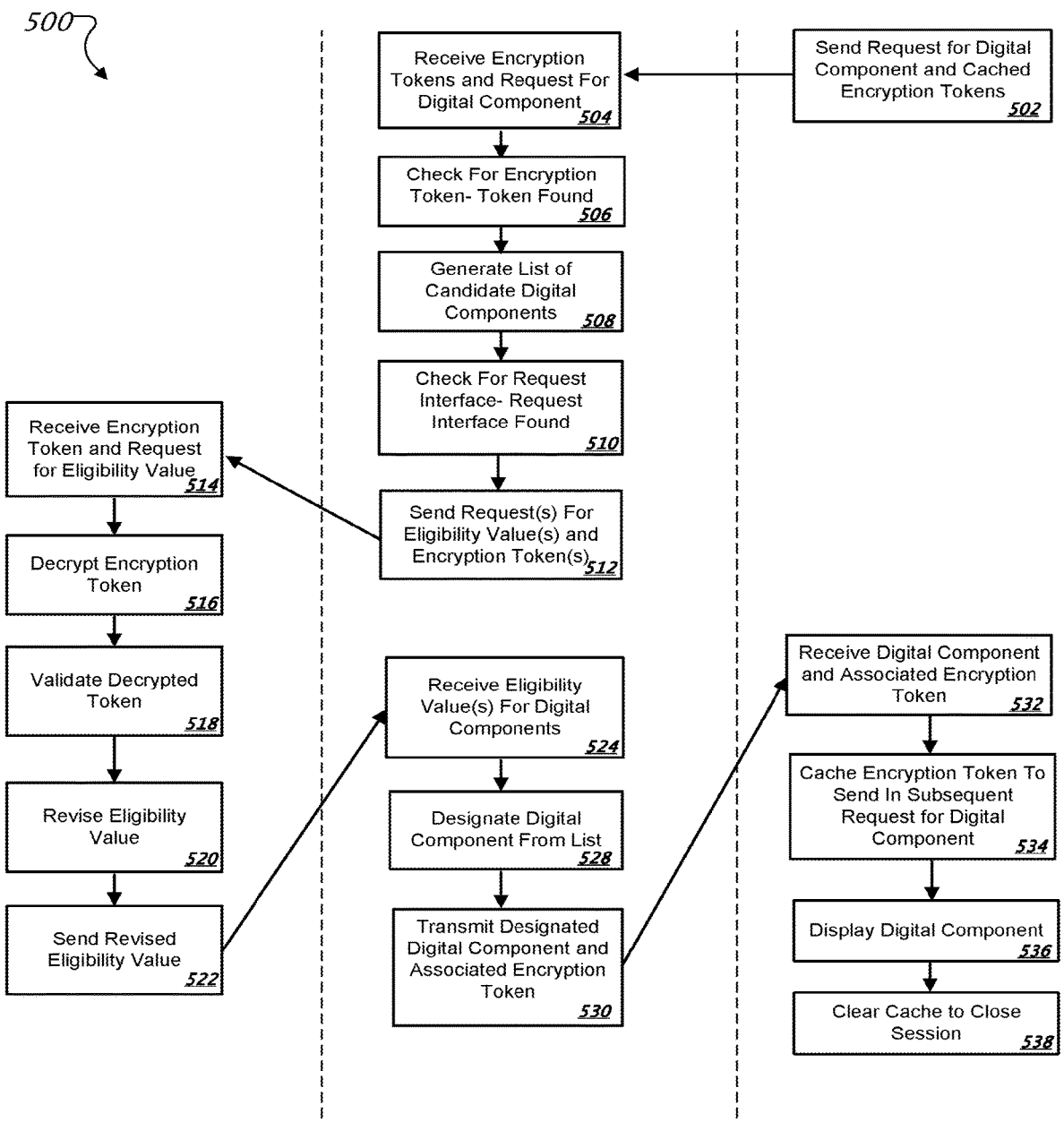

FIG. 5 shows actions 500 taken for deduplication of digital component service. A client device 105 (e.g., terminal device 106 of FIG. 1) sends (502) a request for a digital component to the digital component deduplication system 102. The request includes encryption token data. The digital component receives (504) the request and the encryption token data. The digital component deduplication system 102 checks (506) for the token of the request and finds the token. The digital component deduplication system 102 generates (508) a list of candidate digital components for logic execution processes. The digital component deduplication system 102 checks (510) for a request interface associated with the digital component and finds one. The digital component deduplication system 102, by invoking the registered endpoint of the digital component provider 108, sends (512) a request for eligibility values to the digital component provider 108.

The digital component provider receives 514 the request and the encryption token. The digital component provider 108 decrypts the encryption token and validates the encryption token as described with reference to FIG. 1. The digital component provider can determine if the digital component for which the eligibility value is requested has already been shown to the client device 105. The digital component provider revises (520) the eligibility value based on the validation.

The digital component provider sends (522) the eligibility values to the digital component deduplication system 102. The digital component deduplication system 102 receives (524) the values and designates (528) a digital component from the list for transmitting to the client device 105. The digital component deduplication system 102 transmits (530) the designated digital component and associated encryption token to the client device 105.

The client device 105 receives (532) the digital component and associated encryption token. The client device caches (534) the token to send with subsequent requests for digital components during the current session. The client device 105 displays (536) the digital component. If the current session is ending, the client device 105 clears (538) the cache.

Figure 6:
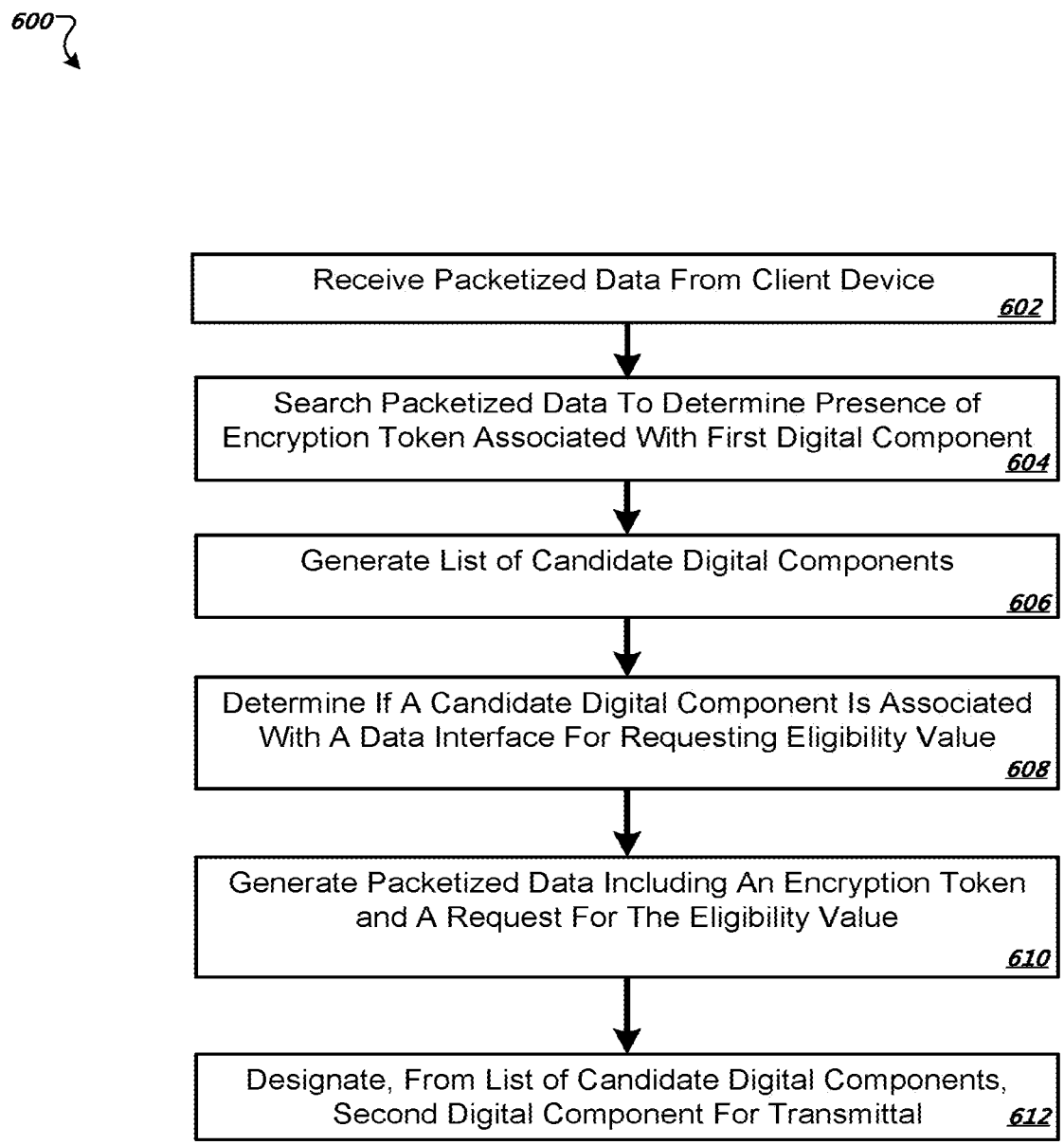
FIG. 6 is a flow diagram showing actions taken for digital component service deduplication.

FIG. 6 shows a flow diagram representing a process 600 for digital component deduplication. The digital component deduplication system (e.g., digital component deduplication system 102 of FIG. 1 receives (602) packetized data from a client device. The digital component deduplication system 102 searches the packetized data to determine the presence of encryption tokens associated with a first digital component that was transmitted in response to a prior request for digital component data. A list of candidate digital components is generated (606). The digital component determines (608) if a candidate digital component is associated with a data interface (e.g., registered with an API) for requesting an eligibility value. The digital component deduplication system 102 generates (610) packetized data including an encryption token and a request for the eligibility value. The digital component deduplication system 102 designates (612), from the list of candidate digital components, a second digital component for transmission to a terminal device.

Figure 7:
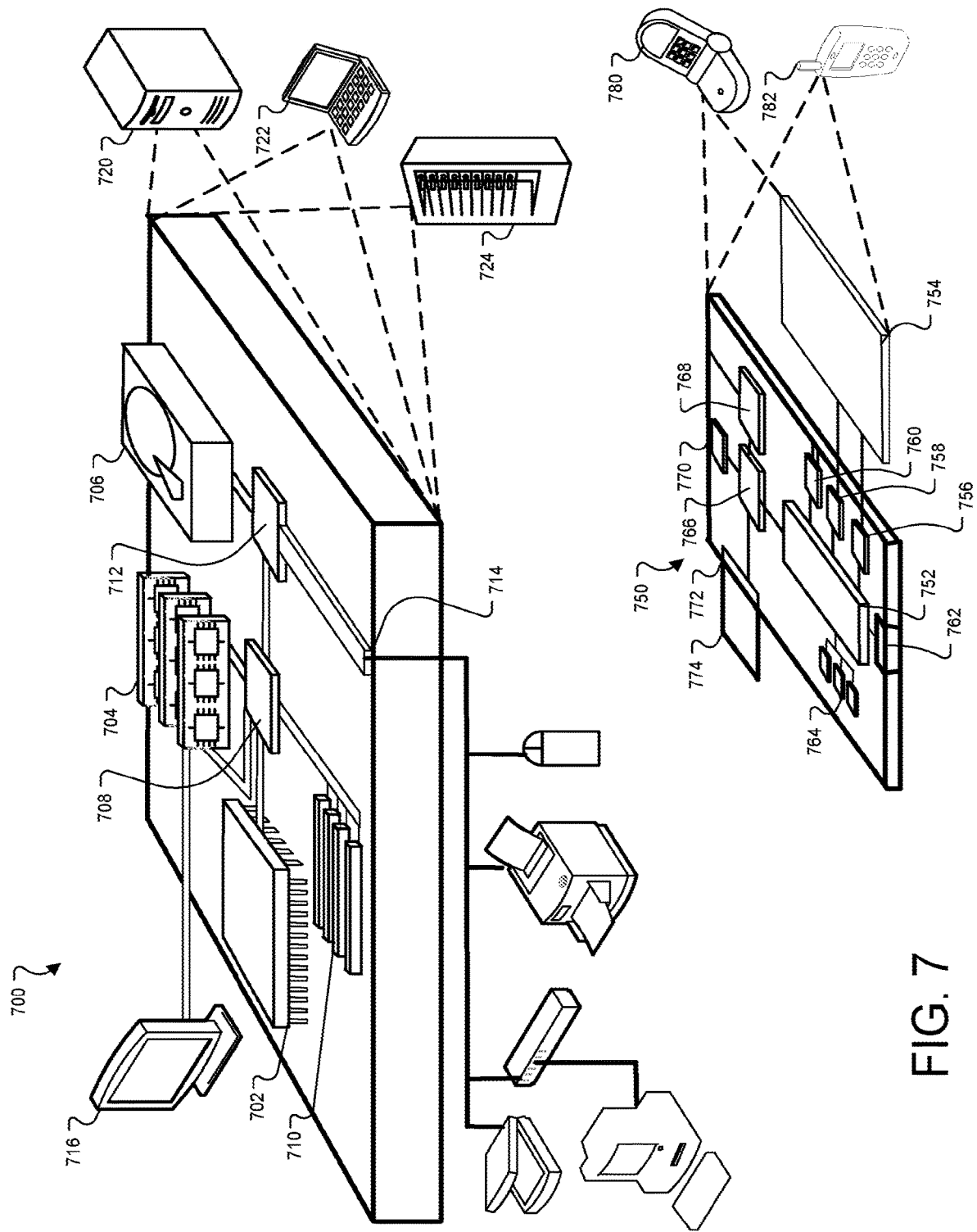
FIG. 7 is a block diagram of components of a system for digital component service deduplication.

FIG. 7 shows example computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. Additionally, computing device 700 or 750 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various buses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing devices 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be in communication with processor 752, so as to enable near area communication of device 750 with other devices. External interface 762 may provide, for example, for wired communication, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In-Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752 that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for deduplication of digital component delivery may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A method for digital component deduplication, the method comprising:
   receiving, from a first client device, a request for a digital component, the request including data representing a first digital component that has already been transmitted to the first client device;
   generating, based on the data representing the first digital component and in response to the request, a list of candidate digital components that excludes the first digital component that has already been transmitted to the first client device, comprising:
      filtering digital components that match the first digital component from the list of candidate digital components using the data representing the first digital component; and
   selecting, from the list of candidate digital components that excludes the first digital component that has already been transmitted to the first client device, a second digital component for transmission to the first client device, comprising:
      determining that a particular candidate digital component of the list is associated with an interface for requesting an eligibility value for the particular candidate digital component from a second client device associated with the particular candidate digital component;
      generating a request for the eligibility value that includes the data representing the first digital component that has already been transmitted to the first client device;
      transmitting the request for the eligibility value to the second client device using the interface;
      receiving the eligibility value from the second client device; and
      selecting, from the list of candidate digital components, the second digital component for transmission to the first client device based at least in part on the eligibility value, wherein the second digital component is different than the first digital component;
   wherein the second digital component is transmitted to the first client device in response to being selected for transmission to the first client device.

2. The method of claim 1, wherein the data representing the first digital component that has already been transmitted to the first client device comprises an encryption token representing the first digital component that has already been transmitted to the first client device.

3. The method of claim 2, further comprising:
receiving an encryption key from the second client device; and
using the encryption key to decrypt the encryption token representing the first digital component that has already been transmitted to the first client device.

4. The method of claim 3, wherein the encryption key comprises a private key of the second client device.

5. The method of claim 2, wherein the encryption token comprises keyed data representing the first digital component that has already been transmitted to the first client device, wherein generating the list of candidate digital components that excludes the first digital component that has already been transmitted to the first client device comprises:
searching a keyed database storing keyed data, with each item of keyed data representing a particular digital component, to identify contents of one or more entries in the keyed database that includes keyed data representing the first digital component.

6. The method of claim 2, wherein the keyed data of the encryption token uniquely identifies the first digital component that has already been transmitted to the first client device, and when the keyed data is decrypted, the keyed data matches an identifier of the first digital component that has already been transmitted to the first client device.

7. The method of claim 2, further comprising transmitting, to the first client device, the second digital component and an encryption token representing the second digital component.

8. A system comprising:
one or more computers; and
one or more storage devices communicatively coupled to the one or more computers, wherein the one or more storage devices store instructions that, when executed by the one or more computers, cause the one or more computers to perform operations for digital component deduplication, the operations comprising:
receiving, from a first client device, a request for a digital component, the request including data representing a first digital component that has already been transmitted to the first client device;
generating, based on the data representing the first digital component and in response to the request, a list of candidate digital components that excludes the first digital component that has already been transmitted to the first client device, comprising:
filtering digital components that match the first digital component from the list of candidate digital components using the data representing the first digital component; and
selecting, from the list of candidate digital components that excludes the first digital component that has already been transmitted to the first client device, a second digital component for transmission to the first client device, comprising:
determining that a particular candidate digital component of the list is associated with an interface for requesting an eligibility value for the particular candidate digital component from a second client device associated with the particular candidate digital component;
generating a request for the eligibility value that includes the data representing the first digital component that has already been transmitted to the first client device;
transmitting the request for the eligibility value to the second client device using the interface;
receiving the eligibility value from the second client device; and
selecting, from the list of candidate digital components, the second digital component for transmission to the first client device based at least in part on the eligibility value, wherein the second digital component is different than the first digital component;
wherein the second digital component is transmitted to the first client device in response to being selected for transmission to the first client device.

9. The system of claim 8, wherein the data representing the first digital component that has already been transmitted to the first client device comprises an encryption token representing the first digital component that has already been transmitted to the first client device.

10. The system of claim 9, wherein the operations further comprise:
receiving an encryption key from the second client device; and
using the encryption key to decrypt the encryption token representing the first digital component that has already been transmitted to the first client device.

11. The system of claim 10, wherein the encryption key comprises a private key of the second client device.

12. The system of claim 9, wherein the encryption token comprises keyed data representing the first digital component that has already been transmitted to the first client device, wherein generating the list of candidate digital components that excludes the first digital component that has already been transmitted to the first client device comprises:
searching a keyed database storing keyed data, with each item of keyed data representing a particular digital component, to identify contents of one or more entries in the keyed database that includes keyed data representing the first digital component.

13. The system of claim 9, wherein the keyed data of the encryption token uniquely identifies the first digital component that has already been transmitted to the first client device, and when the keyed data is decrypted, the keyed data matches an identifier of the first digital component that has already been transmitted to the first client device.

14. The system of claim 9, wherein the operations further comprise transmitting, to the first client device, the second digital component and an encryption token representing the second digital component.

15. One or more non-transitory computer storage media storing instructions that when executed by one or more computers cause the one or more computers to perform operations for digital component deduplication, the operations comprising:
receiving, from a first client device, a request for a digital component, the request including data representing a first digital component that has already been transmitted to the first client device;
generating, based on the data representing the first digital component and in response to the request, a list of candidate digital components that excludes the first digital component that has already been transmitted to the first client device, comprising:

filtering digital components that match the first digital component from the list of candidate digital components using the data representing the first digital component; and selecting, from the list of candidate digital components that excludes the first digital component that has already been transmitted to the first client device, a second digital component for transmission to the first client device, comprising:
- determining that a particular candidate digital component of the list is associated with an interface for requesting an eligibility value for the particular candidate digital component from a second client device associated with the particular candidate digital component;
- generating a request for the eligibility value that includes the data representing the first digital component that has already been transmitted to the first client device;
- transmitting the request for the eligibility value to the second client device using the interface;
- receiving the eligibility value from the second client device; and
- selecting, from the list of candidate digital components, the second digital component for transmission to the first client device based at least in part on the eligibility value, wherein the second digital component is different than the first digital component;

wherein the second digital component is transmitted to the first client device in response to being selected for transmission to the first client device.

16. The non-transitory computer storage media of claim 15, wherein the data representing the first digital component that has already been transmitted to the first client device comprises an encryption token representing the first digital component that has already been transmitted to the first client device.

17. The non-transitory computer storage media of claim 16, further comprising:
- receiving an encryption key from the second client device; and
- using the encryption key to decrypt the encryption token representing the first digital component that has already been transmitted to the first client device.

18. The non-transitory computer storage media of claim 17, wherein the encryption key comprises a private key of the second client device.

19. The non-transitory computer storage media of claim 16, wherein the encryption token comprises keyed data representing the first digital component that has already been transmitted to the first client device, wherein generating the list of candidate digital components that excludes the first digital component that has already been transmitted to the first client device comprises:
- searching a keyed database storing keyed data, with each item of keyed data representing a particular digital component, to identify contents of one or more entries in the keyed database that includes keyed data representing the first digital component.

20. The non-transitory computer storage media of claim 16, wherein the keyed data of the encryption token uniquely identifies the first digital component that has already been transmitted to the first client device, and when the keyed data is decrypted, the keyed data matches an identifier of the first digital component that has already been transmitted to the first client device.

* * * * *